United States Patent
Atanasiu et al.

(10) Patent No.: US 9,424,026 B2
(45) Date of Patent: Aug. 23, 2016

(54) VISUALIZATIONS OF INTER-ENTITY CALLS

(71) Applicants: Radu-Florian Atanasiu, Darmstadt (DE); Anne Keller, Darmstadt (DE); Wei Wei, Griesheim (DE); Heiko Witteborg, Griesheim (DE)

(72) Inventors: Radu-Florian Atanasiu, Darmstadt (DE); Anne Keller, Darmstadt (DE); Wei Wei, Griesheim (DE); Heiko Witteborg, Griesheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/500,267

(22) Filed: Sep. 29, 2014

(65) Prior Publication Data

US 2016/0092211 A1 Mar. 31, 2016

(51) Int. Cl.
*G06F 9/44* (2006.01)
*G06F 9/45* (2006.01)

(52) U.S. Cl.
CPC ... *G06F 8/73* (2013.01); *G06F 8/75* (2013.01)

(58) Field of Classification Search
None
See application file for complete search history.

(56) References Cited

U.S. PATENT DOCUMENTS

| | | | |
|---|---|---|---|
| 6,202,199 B1 * | 3/2001 | Wygodny | G06F 11/3636 702/183 |
| 6,282,701 B1 * | 8/2001 | Wygodny | G06F 11/3466 702/183 |
| 7,424,470 B2 | 9/2008 | Pfeifer et al. | |
| 7,493,629 B2 | 2/2009 | Pfeifer | |
| 7,555,549 B1 * | 6/2009 | Campbell | H04L 12/6418 709/223 |
| 7,624,399 B2 | 11/2009 | Pfeifer | |
| 7,698,174 B2 | 4/2010 | Brunswig et al. | |
| 8,413,109 B2 | 4/2013 | Pfeifer et al. | |
| 8,719,224 B2 | 5/2014 | Pfeifer et al. | |
| 8,719,791 B1 * | 5/2014 | MacPherson | G06F 11/3636 717/104 |
| 8,732,655 B2 | 5/2014 | Pfeifer | |
| 2002/0087949 A1 * | 7/2002 | Golender | G06F 9/4446 717/124 |
| 2003/0159133 A1 * | 8/2003 | Ferri | G06F 11/3636 717/130 |
| 2004/0075690 A1 * | 4/2004 | Cirne | G06F 11/323 715/771 |
| 2006/0089728 A1 * | 4/2006 | Maeda | G05B 19/056 700/18 |
| 2006/0242627 A1 * | 10/2006 | Wygodny | G06F 11/3636 717/128 |
| 2006/0248401 A1 * | 11/2006 | Carroll | G06F 11/3423 714/38.1 |

(Continued)

OTHER PUBLICATIONS

"Symbol Table Format," Ployhedron.com, 1995.*

(Continued)

*Primary Examiner* — Insun Kang
(74) *Attorney, Agent, or Firm* — Fish & Richardson P.C.

(57) ABSTRACT

The disclosure generally describes computer-implemented methods, software, and systems, including methods for generating visualizations. On a client side, a user request is received for an inter-entity call visualization. Code analysis data is accessed. A visualization model is built. The visualization is shown. User inputs are received for interacting with the visualization. The visualization is updated based on the received user inputs. On a server side, a request is received for code analysis data. The requested data collected, including running analyzers for any available data. The requested data is sent. The code analysis data can be used for other purposes than visualizations.

23 Claims, 8 Drawing Sheets

(56) References Cited

U.S. PATENT DOCUMENTS

| | | | |
|---|---|---|---|
| 2008/0034351 A1* | 2/2008 | Pugh | G06F 11/36 717/128 |
| 2008/0127109 A1* | 5/2008 | Simeon | G06F 11/3409 717/128 |
| 2008/0163178 A1* | 7/2008 | Ivanova | G06F 11/3664 717/128 |
| 2010/0153432 A1 | 6/2010 | Pfeifer et al. | |
| 2010/0180261 A1* | 7/2010 | Lin | G06F 11/3636 717/128 |
| 2011/0107313 A1* | 5/2011 | Baron | G06F 8/20 717/130 |
| 2011/0258604 A1* | 10/2011 | Drukman | G06F 11/3636 717/125 |
| 2012/0144374 A1* | 6/2012 | Gallagher | G06F 11/362 717/128 |
| 2012/0260135 A1* | 10/2012 | Beck | G06F 11/323 714/45 |
| 2012/0260236 A1* | 10/2012 | Basak | G06F 11/323 717/132 |
| 2012/0311536 A1* | 12/2012 | Fanning | G06F 8/75 717/123 |
| 2012/0311540 A1* | 12/2012 | Fanning | G06F 11/3612 717/127 |
| 2013/0019227 A1* | 1/2013 | Chiu | G06F 11/3628 717/125 |
| 2013/0091387 A1* | 4/2013 | Bohnet | G06F 11/3612 714/38.1 |
| 2013/0132780 A1* | 5/2013 | Bohnet | G06F 11/3612 714/45 |
| 2013/0151317 A1 | 6/2013 | Charfi et al. | |
| 2013/0159354 A1 | 6/2013 | Heinzl et al. | |
| 2013/0268911 A1 | 10/2013 | Charfi et al. | |
| 2014/0067836 A1 | 3/2014 | Holmes et al. | |
| 2014/0096112 A1* | 4/2014 | DeLine | G06F 8/75 717/125 |
| 2014/0100840 A1 | 4/2014 | Pfeifer et al. | |
| 2014/0108463 A1* | 4/2014 | Gagliardi | G06F 11/3495 707/797 |
| 2015/0234642 A1* | 8/2015 | Araya | G06F 3/04842 717/137 |

OTHER PUBLICATIONS

"Appendex A—Symbol Table Format," Polyhedron.com, 2007.*

Google search for symbol table format polyhedron, retrieved on Apr. 16, 2016.*

* cited by examiner

VISUALIZATIONS OF INTER-ENTITY CALLS

CROSS-REFERENCE TO RELATED APPLICATIONS

This application is a co-pending application of U.S. application Ser. No. 14/500,164, filed on Sep. 29, 2014, entitled "CODE ANALYSIS FOR CLOUD-BASED INTEGRATED DEVELOPMENT ENVIRONMENTS"; the contents of which are incorporated herein by reference.

TECHNICAL FIELD

The present disclosure relates to computer-implemented methods, software, and systems for software development.

BACKGROUND

Many modern software development platforms have integrated layers that support a full spectrum of application life cycle activities such as an integrated development environment (IDE) for application development, a runtime for execution and debugging, a web service for public consumption of hosted applications, a database for persistency, and/or other layers for other purposes. Environments having such layers have become a trend in modern cloud-computing networks.

For computing languages such as JAVASCRIPT, used for application development, software engineers ("developers," "software developers," etc.) increasingly need proper IDE tools to make the usage of the computing languages more productive. However, the lack of such IDE tools often forces developers to instead use sophisticated text editors. The lack of an advanced code analysis infrastructure is one of the reasons for the non-existence of such IDEs.

Changes in a software platform architecture can present opportunities and challenges in how modern software applications can be designed, developed, analyzed, executed, and/or maintained, and the changes can influence software development using IDEs. For example, an IDE based in a cloud platform can be accessed through web services such that a developer can use in an Internet browser. Current implementations of such cloud-based IDEs are often primitive and may lack features common to dedicated IDEs installed locally on a developer's computer, such as ECLIPSE, NETBEANS, and VISUAL STUDIO. Examples of features that may be lacking from primitive IDEs can include code completion, refactoring, outlining, and/or other features, some of which may require static or runtime analysis of application code. Ideally, such analyses should be easily available, aggregated and ready for use by a user, such as a software developer. These conditions can be considered, for example, in the design and development of cloud-based distributed software development environments.

An important difference in a cloud-based development environment as opposed to locally-installed IDE's is that a cloud-based IDE is generally shared by multiple or all of the developers working on the platform. With traditional IDEs, such as ECLIPSE, the IDE is typically installed separately on each developer's computer, so that the IDE's usage is isolated from others (apart, for example, from the use of versioning control to synchronize code). In the cloud-based IDE, for example, information can be more readily and easily shared among developers, which can be beneficial in scenarios such as code reuse, team collaboration, and/or other scenarios. An example consequence is that, when code analysis is designed and built for such a shared IDE, the same analysis should not be run separately by each developer repeatedly.

When developing software applications, having an understanding of the source code (simply called "code" from here on) is important for developers. More specifically, it is crucial to understand dependencies between different code artifacts, e.g., functions and/or other software components. Understanding dependencies can be important for both pure software development tasks, as well as for tasks that deal with existing code artifacts such as refactoring and maintenance. In some implementations, code visualizations, including visualizations that are part of a cloud-based computer code analysis, can be used in making the structure of a program more understandable, e.g., aiding the developer in understanding the code.

SUMMARY

The disclosure generally describes computer-implemented methods, software, and systems for providing an entity dictionary derived from code analysis, and for providing visualizations based on the entity dictionary. For example, a system for providing visualizations includes at least one processor. The system further includes an inter-entity call visualization system, including instructions operable, when executed by the at least one processor, for generating instructions for displaying and interacting with visualizations. The instructions are operable to provide plural visualizations showing relationships among entities. The instructions are further operable to receive user inputs associated with the display of a given visualization. The instructions are further operable to perform one or more operations on the visualization based on the received user inputs. The system further includes an analysis layer for retrieving static and dynamic analysis data from multiple analyzers and aggregating the static and dynamic analysis data in a form of an entity dictionary for use by the inter-entity call visualization system. The system further includes a client device for displaying visualizations received from the inter-entity call visualization system.

In another example, computer-implemented methods are included for providing visualizations. One computer-implemented method includes receiving static information for entities using information from an entity dictionary that identifies entities in the entity dictionary. The entity dictionary includes, for each entity, an abstract syntax tree reference, an entity type, a location, a list of called entities, a list of called-by entities, a scope, a parameter set including parameter items, and comments. For each called entity, the entity dictionary includes a called entity identifier, a location, and a set of candidate call entities. For each parameter item, the entity dictionary includes a parameter type and a parameter name. For each candidate called entity, the entity dictionary includes a candidate entity identifier and a matching score. The computer-implemented method further includes receiving dynamic information associated with the entities received at run-time. The computer-implemented method further includes receiving a request for a visualization, the visualization including a hierarchical representation of inter-entity calls, including inter-entity calls between entities in a same source code file or between entities in different files, including source code files of weakly-typed, prototype-based languages. The computer-implemented method further includes analyzing the received static and dynamic information. The computer-implemented method further includes generating, based on the analyzing, instructions for presenting the visualization. The computer-implemented method further includes receiving user inputs for interacting with the visualization. The computer-implemented method further includes updating the visualization based on the received user inputs.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, the entities are entities associated with computer code.

In a second aspect combinable with any of the previous aspects, the visualization is one of an inter-entity, call-directed graph visualization, an inter-entity, call-collapsible tree visualization, and an inter-entity, call-outline list visualization.

In a third aspect combinable with any of the previous aspects, the visualization is integrated with an integrated development environment (IDE) including an editor.

In a fourth aspect combinable with any of the previous aspects, the IDE is cloud-based and the visualization is part of a cloud-based computer code analysis.

In a fifth aspect combinable with any of the previous aspects, user actions in either one of a given visualization or the IDE cause actions to occur in the other.

In a sixth aspect combinable with any of the previous aspects, the one or more operations include hiding elements of the visualization, exposing elements of the visualization, changing a central focus of the visualization, displaying additional information associated with a particular element.

In a seventh aspect combinable with any of the previous aspects, the one or more operation include switching the display to a different visualization and causing associated elements in the visualization or the editor to be highlighted.

The subject matter described in this specification can be implemented in particular implementations so as to realize one or more of the following advantages. First, visualizations can make it easier for programmers to distinguish, at design time, instantiations of functions or objects defined within the code, including for prototype-based, weakly-typed languages. Second, programmers can understand the flow of programming logic and be able to interact or navigate to certain points in the flow, which can be useful when creating, maintaining or debugging applications, especially if visualizations are tightly woven into the capabilities of an IDE. For example, a machine-readable structure can hold a representation of the code that abstracts away some features, while at the same time implicitly embedding other features.

An integrated system, for example, can provide code analysis results to developers using IDEs and other tools. For example, a code analysis layer can be centralized and built directly into a cloud platform, serving all developers at once. The centralized code analysis layer can be more efficient in terms of computational resource usage and more powerful, e.g., by having knowledge about all the code and other software artifacts on the platform. The code analysis layer can provide static information that can be made even more accurate using runtime information. The code analysis results can allow a developer, for example, to respond more quickly to code changes. For example, a central repository can provide triggers to run code analysis whenever a file is created, saved, and/or deleted. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
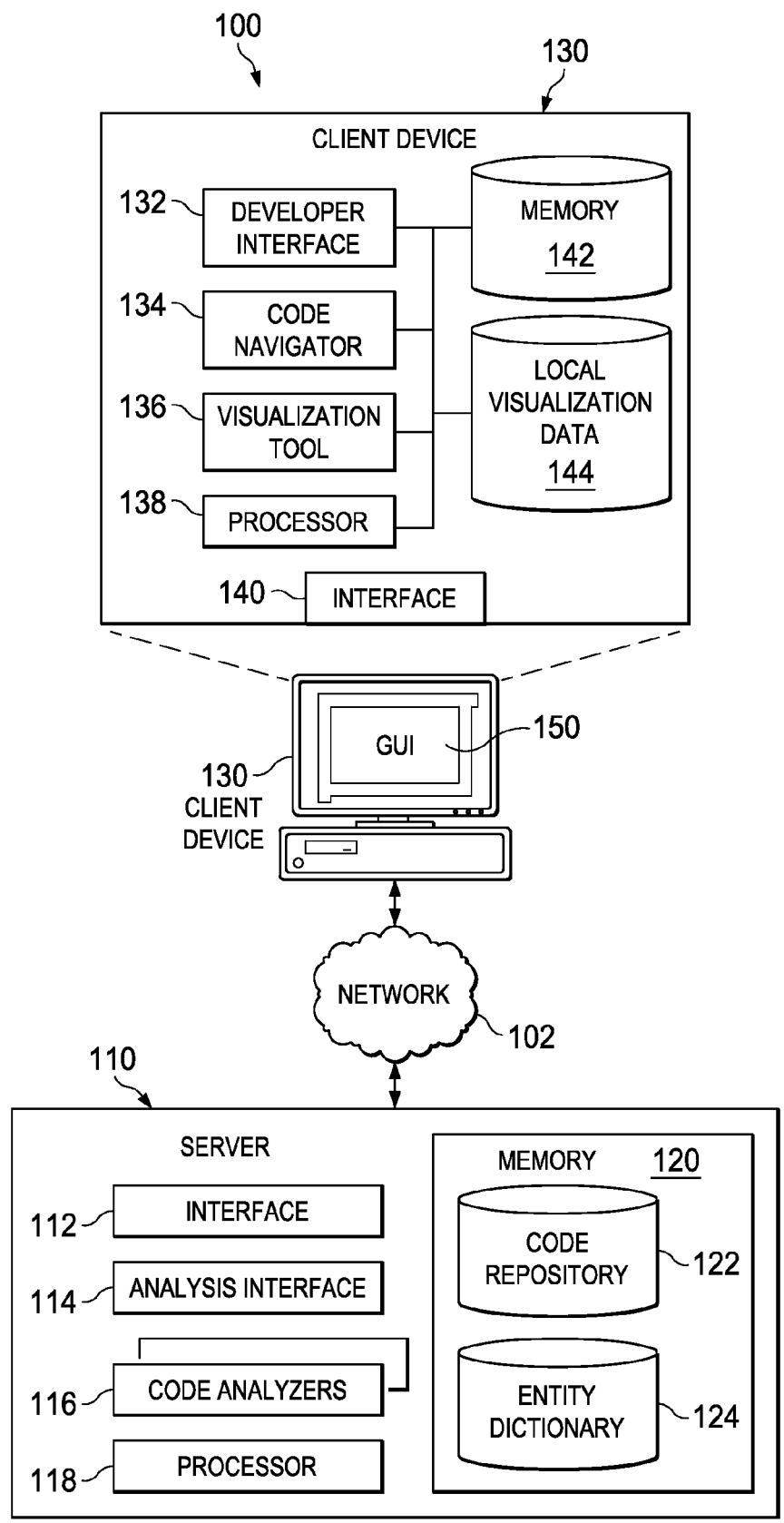
FIG. 1 is a block diagram illustrating an example environment for providing and updating inter-entity call visualizations.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes computer-implemented methods, software, and systems for providing an entity dictionary derived from code analysis, including cloud-based code analysis, and for providing visualizations based on this dictionary. Generating and presenting the visualizations, for example, can help a developer understand the structure and behavior of large programs and/or programs that are comprised of several entities (e.g., functions, etc.) in the same source file, including cloud-based programs and/or computer code.

Visualizations may have associated general requirements and/or design goals. For example, visualizations should be easily accessible, show relevant information in a non-cluttered view, and use well-established visual metaphors for represented entities. Visual components of visualizations, for example, can include directed graph edges that represent function calls. Furthermore, visualizations should allow the developer to interactively explore the code with the visualization as a basis.

In some implementations, allowing the developer to interactively explore the code with the visualization can be achieved, for example, through a tight integration of the visualization and an editor or IDE. The integration, for example, can make use of editor or IDE features such as code navigation and code highlighting. Lastly, for weakly-typed languages, the visualization can show both the discernible structure of the program and provide other information.

Code analysis can be used in addition to visualization and other tools to allow a clear picture of what the programming code represents. For example, information about the code can be extracted statically, by means of parsing the programming code and inferring its properties using the syntax and semantics imposed by the programming language. Information about the code can also be extracted during execution of the code, thus obtaining runtime information.

Some dynamic, prototype-based, weakly-typed computing languages, such as ECMASCRIPT (more popularly known as JAVASCRIPT), can complicate code analysis and the ability to create visualizations. For instance, computing languages that allow a program and its subordinate entities to reside in the same file can complicate some parts of software development, such as code completion, code preview, code navigation, detecting variable scope or variable type, visualizing function/object dependencies, function calls, object instantiations, refactoring, and/or other capabilities that make a software development environment more user-friendly.

In some implementations, a data structure can be used to hold information about the program, so as to provide an intermediate representation. The information can support consumption by automatic and non-automatic processes, for example, including displaying information about the program in a visual manner, and locating blocks of code for other software development purposes. Data structures to support these processes, for example, can represent program information in the form of a dictionary-like structure, such as using an abstract syntax tree representation of the program, as described below.

FIG. 1 is a block diagram illustrating an example environment 100 for providing and updating inter-entity call visualizations. Specifically, the illustrated environment 100 includes, or is communicably coupled with, a server 110 and at least one client device 130. For example, a user, such as a developer, can interact with user interfaces presented on the client device 130 using information provided by the server 110. The environment 100 shown in FIG. 1 provides a high-level, conceptual understanding, but a more detailed architecture is provided below with respect to FIG. 2.

At a high level, the server 110 comprises an electronic computing device operable to perform code analysis and handle requests from client devices 130 for information associated with the code, including code analysis results. The server 110 can also request the analysis of code, such as when requests are received, and store the code analysis results for use by plural developers using plural client devices 130. For example, the server 110 can provide the processing and support necessary for client devices 130 to present visualizations to multiple developers.

For example, although FIG. 1 illustrates a single server 110, the environment 100 can be implemented using two or more servers 110, as well as computers other than servers, including a server pool. Indeed, the server 110 may be any computer or processing device. According to some implementations, the server 110 may also include, or be communicably coupled with, an e-mail server, a Web server, a caching server, a streaming data server, and/or other suitable server(s). In some implementations, components of the servers 110 may be distributed in different locations and coupled using the network 102.

The server 110 includes an interface 112, an analysis interface 114, plural code analyzers 116, a processor 118, and a memory 120. The interface 112 is used by the server 110 for communicating with other systems in a distributed environment, connected to the network 102 (e.g., the client device 130), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The analysis interface 114, for example, can serve as the main communication interface for client devices 130. For example, based on requests received from one or more client devices 130, the analysis interface 114 can assemble and aggregate information about developed applications, e.g., by accessing source code files and associated meta-information. The analysis interface 114 can also identify and/or provide information associated with relationships between files. For example, the analysis interface 114 can access previously generated analysis results, e.g., from the entity dictionary 124, or if necessary, the analysis interface 114 can invoke the code analyzers to perform additional analysis.

The code analyzers 116, for example, can perform various kinds of analysis associated with code. As described in more detail below, static analysis can be performed on source code, and dynamic analysis can be performed at runtime, such as by a debugger.

The processor 118, for example, can execute instructions and manipulate data to perform the operations of the server 110. Although illustrated as the single processor 118 in FIG. 1, two or more processors 118 may be used according to particular needs, desires, or particular implementations of the server 110.

The server 110 also includes the memory 120, or multiple memories 120. The memory 120 may include any type of memory and/or database module. The memory 120 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 110. Additionally, the memory 120 may include any other appropriate data, such as VPN applications, firmware logs and policies, firewall policies, a security or access log, print or other reporting files, as well as others. In some implementations, memory 120 includes a code repository 122 that includes program files, each potentially containing multiple entities, e.g., functions and/or other components). In some implementations, memory 120 also includes an entity dictionary 124, e.g., that is a data dictionary that includes inter-entity call information for entities identified in the source code in the code repository 122. More details of the entity dictionary 124 are provided below with respect to FIG. 4. Other components within the memory 120 are possible.

The illustrated environment of FIG. 1 also includes the client device 130, or multiple client devices 130. The client device 130 may be any computing device operable to connect to, or communicate with, at least the server 110 via the network 102 using a wire-line or wireless connection. In general, the client device 130 comprises an electronic computer device operable to receive, transmit, process, and store any appropriate data associated with the environment 100 of FIG. 1.

The illustrated client device 130 includes a developer interface 132. For example, the developer interface 132 can serve as an interface between a user using the client device and code-related resources, such as an IDE and/or other resources.

The illustrated client device 130 further includes a code navigator 134. The code navigator 134, for example, can provide services for use by a developer for displaying and moving to different portions of source code. For example, the code navigator 134 can allow the developer to jump from a function call to the corresponding function definition, e.g., within an editor or in an IDE.

The illustrated client device 130 further includes a visualization tool 136. The user of the client device 130, for example, can use the visualization tool 136 as a front end to the server 110 for requesting and displaying visualizations. During use of the visualization tool 136, for example, data that supports the visualization(s) currently being viewed can be stored (e.g., cached) in the local visualization data 144.

The illustrated client device 130 further includes an interface 140, a processor 138, and a memory 142. The interface 140 is used by the client device 130 for communicating with other systems in a distributed environment—including within the environment 100—connected to the network 102, e.g., the server 110, as well as other systems communicably coupled to the network 102 (not illustrated). Generally, the interface 140 comprises logic encoded in software and/or hardware in a suitable combination and operable to communicate with the network 102. More specifically, the interface 140 may comprise software supporting one or more communication protocols associated with communications such that the network 102 or interface's hardware is operable to communicate physical signals within and outside of the illustrated environment 100.

As illustrated in FIG. 1, the client device 130 includes the processor 138. Although illustrated as the single processor 138 in FIG. 1, two or more processors 138 may be used according to particular needs, desires, or particular implementations of the environment 100. Generally, the processor 138 executes instructions and manipulates data to perform the operations of the client device 130. Specifically, the processor 138 executes the functionality required to send requests to the server 110 and to receive and process responses from the server 110.

In some implementations, the illustrated client device 130 includes local visualization data 144. For example, the local visualization data 144 can include data supporting the visualization that has been previously received from the server 110, e.g., for the visualization(s) currently being presented by the visualization tool 136.

The illustrated client device 130 also includes a memory 142, or multiple memories 142. The memory 142 may include any memory or database. The memory 142 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 130. Additionally, the memory 142 may include any other appropriate data, such as VPN applications, firmware logs and policies, firewall policies, a security or access log, print or other reporting files, as well as others.

The illustrated client device 130 is intended to encompass any computing device such as a smart phone, tablet computing device, PDA, desktop computer, laptop/notebook computer, wireless data port, one or more processors within these devices, or any other suitable processing device. For example, the client device 130 may comprise a computer that includes an input device, such as a keypad, touch screen, or other device that can accept user information, and an output device that conveys information associated with the operation of the server 110 or the client device 130 itself, including digital data, visual information, or a graphical user interface (GUI) 150, as shown with respect to and included by the client device 130. The GUI 150 interfaces with at least a portion of the environment 100 for any suitable purpose, including generating a visual representation of a Web browser. In particular, the GUI 150 may be used to view and navigate various Web pages located both internally and externally to the server 110.

Figure 2:
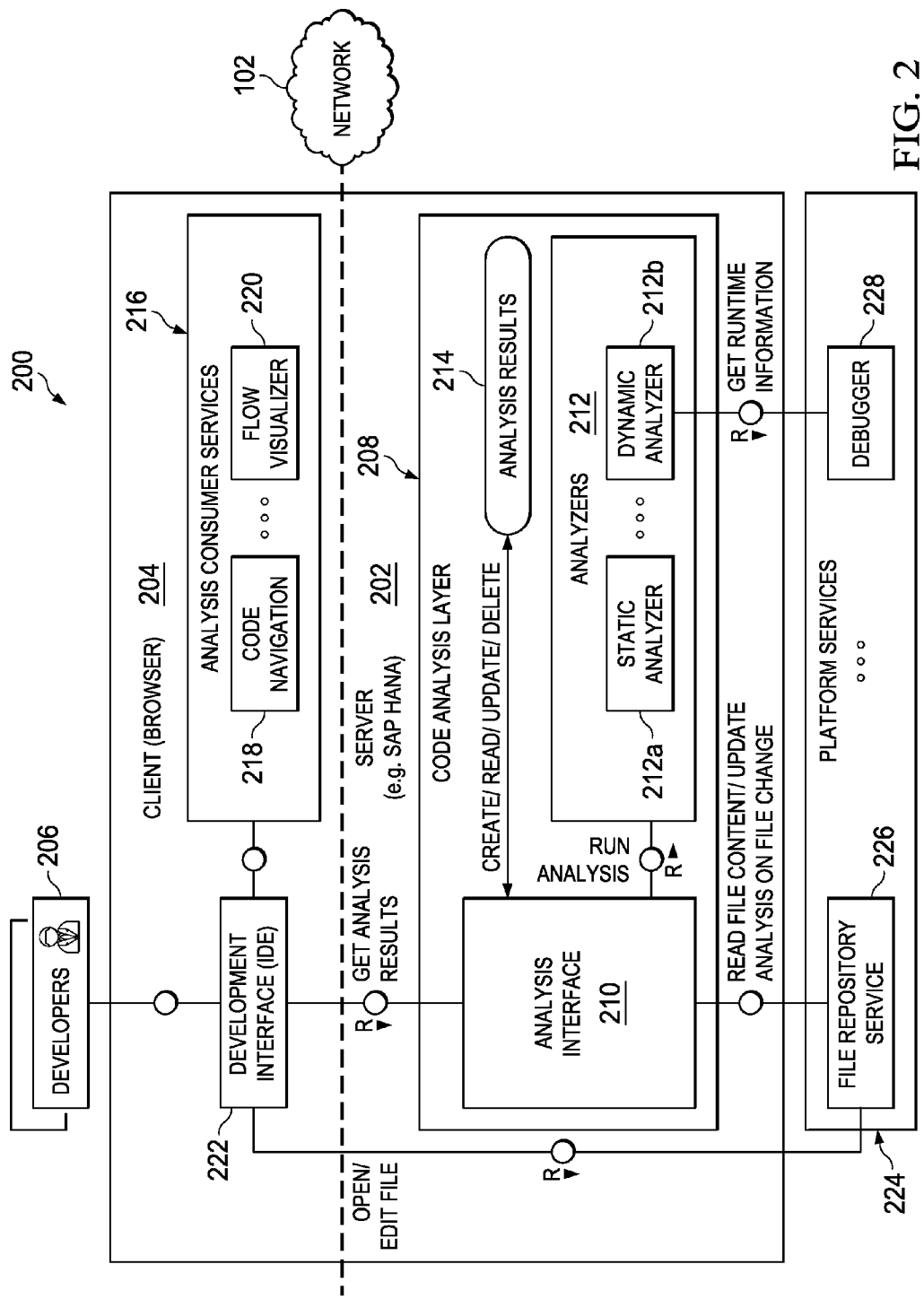
FIG. 2 is a block diagram of an example cloud-based code analysis system.

FIG. 2 is a block diagram of an example cloud-based code analysis system 200. The system 200 includes a server 202 that can provide code analysis services to at least one client 204, such as including browsers and/or other applications. For example, each of one or more developers 206, such as software developers, can use a client 204 to interact with various software development tools, including IDEs. The tools can include, for example, visualizations that are based on code analysis provided by the server 202 for presentation to the developers 206 using clients 204. Clients 204 can be connected to the server 202 using the network 102, as described above. The server 202 can be located at a central facility or can include and/or logically connect plural servers 202 at different locations that are connected using the network 102. In some implementations, elements of the cloud-based code analysis system 200 are represented, or implemented by, similar and/or different components in the environment 100.

A code analysis layer 208, that is the main component in the server 202, can provide code analysis information (e.g., including meta-information) for use by the developers 206. The code analysis information can be extracted by the server 202 from a variety of code analysis sources, and can provide the developers 206 with information about software code that is being developed or used. The code analysis information can be provided, for example, to a user interaction layer for facilitating the development of code and/or other code-related functions. In some implementations, the user interaction layer can include the client 204, including a browser and/or other applications. The code analysis information can be used in other ways, such as for coding helpers (e.g., including auto-completion, refactoring and navigation), visual representations of the code (e.g., visualizations 300, 320 and 340 described below with reference to FIGS. 3A-3C), evaluation of the code, performance information, and for other functions. The code analysis layer 208 may also be regarded as a black box—a service for performing analysis of files on request.

In some implementations, components of the code analysis layer 208 can include an analysis interface 210 that can serve as the main communication and information aggregation component. The analysis interface 210 can perform a variety of functions, such as providing communication with front-end components, including clients 204 and other web-based development environments that request and/or receive code analysis results provided by the server 202. Other functions of the analysis interface 210 can include assembling and aggregating information about developed applications, identifying and providing information associated with relationships between files (e.g., as identified by analyzers 212), deciding when to run different types of analyses, updating an analysis results database 214, monitoring file changes, and updating the analysis results database 214 accordingly for an entire application associated with a particular file.

In some implementations, the code analysis layer 208 is not a visualization-specific system. For example, the code analysis layer 208 can provide code analysis data in a form of the data structure described below with reference to FIG. 4. For example, in addition to consumption by the visualizations described below with respect to FIGS. 3A-3C, the code analysis data can be consumed by IDE features such as code completion or refactoring. In general, producing the analysis data in a form of the data structure described below with reference to FIG. 4 provides a loose coupling between the code analysis layer 208 and visualizers that produce the visualizations 300, 320 and 340.

The analyzers 212 can include, for example, a static analyzer 212a that uses code-related files and/or programs as input and provides code analysis results as an output. For example, the code analysis results can be determined as a result of processing the code-related files and/or programs in a structured manner. The analysis interface 210 can store the code analysis results in the analysis results database 214, for example. The analyzers 212 can also include, for example, a dynamic analyzer 212b, described below.

The analysis results database 214 can include, for example, a repository for storing code analysis results in the context of an application that is being analyzed. In addition, the stored code analysis results for a file can be correlated with different versions of files and/or applications, such as identified by configuration control systems. The analysis results database 214 can also act as support for access rights control. For example, access rights can control whether certain information can be presented to a certain developer, based on whether the developer has access to the related files or resources from which the analysis information is generated or inferred.

The code analysis layer 208 can support and/or facilitate analysis consumer services 216. The services can include, for example, front-end services that allow developers 206 to interact with web-based development environments and make use of code analysis results exposed by the analysis interface 210. Services exposed by the analysis interface 210 can include, for example, code auto-completers, code navigation 218, refactoring, code suggestion, code pattern analysis, and flow visualizer services 220 (described below with reference to FIGS. 3A-3C). Services of the code analysis layer 208 can be useful, for example, in high-access, high-availability, multi-user development environments, such as where resource usage is a concern and access times are to be minimized. In some implementations, for efficiency purposes, the code analysis layer 208 can run the analyzers 212 only when they are needed. For example, if multiple developers 206 open the same file at substantially the same time, the analysis can be run once, and the code analysis results can be shared by the multiple developers 206.

The following example scenario shows how the code analysis layer 208 can support development activities. For example, the developer 206 may use a development interface 222, such as or including an IDE, to create the developer's own application. Use of the IDE, for example, may open several files within the application. In order to access file contents and metadata, the IDE can, for example, communicate with platform services 224, including the file repository service 226 that has access to a source code repository. At some point during coding, for example, the developer 206 may need to jump from a function call to the corresponding function definition using the code navigator 218 or some other component of the analysis consumer services 216. At this point, through an IDE interface, the code navigator 218 can request analysis of the file. Analysis can occur within the code analysis layer 208, and the IDE can receive corresponding code analysis results by communicating with the analysis interface 210. This is just one example of how the code analysis layer 208 can communicate with other components and aggregate code analysis data from various sources.

Subsequently, the analysis interface 210 can check to see whether a new analysis of the sent file is needed. If new analysis is not needed, then the analysis results database 214 entry corresponding to that file can be returned to the IDE, e.g., to the same or a different developer 206. Otherwise, a new analysis can be performed, and the results can be stored in the analysis results database 214. For example, the analysis interface 210 can aggregate the results from the analyzers 212 (e.g., analyzers 212a and 212b) that perform the new analysis.

In some implementations, the analyzers 212 can communicate with various components of platform services 224, such as a debugger 228. For example, a dynamic analyzer 212b can obtain execution results from the debugger 228 in real time. At the same time, an analysis can be performed on content provided by the file repository service 226. For example, the data used during the analysis can be aggregated, filtered, and/or processed in other ways, depending on the specific needs of each of the analyzers 212.

In some implementations, the code analysis layer 208 can support development of scripting languages, such as for use in JAVASCRIPT applications. For example, the code analysis layer 208 can be incorporated into, and accessible by, an IDE. The IDE, for example, can be integrated into a browser on the client 204 that offers a browser-based integrated development environment for creating applications using information from the server 202.

The analysis interface 210 can act as an agent between repositories of code files, one or more IDEs, and various other code analysis components that are chosen for execution, for example, based on event trigger and handling. In some implementations, the analysis interface 210 can include a parser to retrieve an abstract syntax tree from scripting code and/or other source code, e.g., accessing only the code elements that are needed based on the type of analysis is to be performed. In some implementations, parsers can be implemented using Esprima parsers or some other suitable parsers.

The analysis interface 210 can include static analysis components to retrieve structural code. The analysis interface 210 can provide, for example, a collection of services based on the static and runtime analysis: such as code completion, code navigation (code preview, locating and navigating to function definition), refactoring, code suggestion, code pattern, and so on. For example, the static analyzer 212a or some other static analyzer can perform analysis of static code. The analysis can include producing an entity dictionary that includes information such as the collection of entities and their hierarchies, relations between entities such as function calls, and other information. The entity dictionary, e.g., implemented as a hash table, can be the basis for all other static and runtime analyses, as the entity dictionary can be used to organize the information and track results. Elements of entity dictionaries are described below with respect to FIG. 4.

Runtime analysis components, for example, can retrieve runtime information during code execution, such as runtime data and control flow, performance and profiling, and other runtime data. Runtime information, for example, can serve to enrich code analysis results obtained by the static analyzer 212a, including to improve the accuracy of the information. Accuracy can be improved, for example, for information associated with candidates, parameter values, and in other areas. For example, during runtime analysis, a component that uses the debugger 228 can execute a certain function call and gather information along the execution. The gathered information can then be presented to the developer 206 for a better understanding of the code being executed, such as the runtime values of variables in a certain execution state, specific database content, and other information.

In some implementations, the analysis interface 210 can consist mainly of two interaction agents. For example, a first communication agent can provide communications, e.g., to communicate with front-ends of Web IDEs. For example, the first communication agent can listen for and react to events such as opening/closing of files, file saves, tab changes, cursor moves, keystrokes, and/or other events in order to decide whether a certain analysis is needed or whether the visual presentation of certain analysis results need to be updated/reloaded. A second communication agent can communicate with the analyzers 212 for notifications regarding whether analysis results are readily available or if the analyzers 212 need additional information, e.g., from the IDE or other front-end. The analysis interface 210 can also control maintaining the collection of analyzers 212 and visualizers, as well as having access to the source code repository in case file contents and other software artifacts/information (such as timestamps, file versions) are needed.

The code analysis results can be stored, for example, as column-based tables in the analysis results database 214. Besides persistency, the analysis results database 214 component can also be responsible for controlling access rights. In some implementations, SQLSCRIPT or some other scripting language, for example, can take into consideration which folders and/or files a certain user has access to in order to determine whether the same user should have access to code analysis results that are based on the same folders and/or files. Because SQLSCRIPT can reside and execute in the database layer, for example, the scripts can directly access database content without intermediate data transmission and transformation, thus making their execution more efficient.

One important role of the static analyzer 212*a* is to construct the entity dictionary, as mentioned above, e.g., from the abstract syntax tree of JAVASCRIPT code. The entity dictionary can store key information that enables other static analyses and assists runtime analyzers (e.g., dynamic analyzer 212*b*). Entity dictionaries, together with other analysis results, can be stored in the analysis results database 214. The entity dictionary for a particular source code file need only to be constructed once, and the entity dictionary is fully available in that form until a time when the source code file is modified, the only point in time requiring an update to the corresponding entity dictionary.

Services that use entity dictionaries can include, for example, code preview and navigation. For example, for a given function, the entity dictionary can be consulted to find where the function is defined, the callers of the function, the functions that the given function calls, and other information. Information from the entity dictionary can be used to provide to the developer 206, for example, corresponding documentation (e.g., using JAVADOC style comments), code snippets of the function, or other information. Information from the entity dictionary can also allow the developer 206 to jump directly to whatever files and specific positions in the file in which the function definition occurs.

As described in more detail below with respect to FIGS. 3A-3C, visual representations (or "visualizations") of code can help a developer to understand the application being programmed or maintained. Visualizations can include, for example, code highlighting and code navigation, and can allow interaction with the visualization by the developer. In some implementations, visualizations can be based on a code analysis infrastructure. Visualizations, for example, can be especially useful for prototype-based, weakly-typed programming languages, such as ECMASCRIPT or other languages. In some implementations, visualizations described with respect to FIGS. 3A-3C can be presented by the flow visualizer services 220.

Visualizations can provide at least two main benefits and/or features: visual representations of application code and integration of the representations with an IDE. For example, visual representations of application code can enable the developer to visualize entities (e.g., functions, objects, methods or other software components) and their call dependencies, and can provide call candidates that reflect the inherent uncertainty of call dependencies in scripting languages. In some implementations, visualizations can be enriched to display additional information, such as structural information, code documentation, runtime metadata, and/or other information.

IDE integration of the representations can be used, for example, to update the focus of the visualization based on code selection or cursor position in the code editing window. For example, a developer can use visualizations for code highlighting, code navigation, and interaction with other IDE components, such as the debugger 228. Integration can occur, for example, with different variants or formats of visualizations, such as graph visualizations, tree visualizations, and outline visualizations. Specific examples of different visualizations are described below with respect to FIGS. 3A-3C.

Visualization variants can have a primary purpose to visualize entity calls, and each variant can have one or more distinct advantages over other variants, such as how each variant may best be used by a user (e.g., developer). For example, different visualization variants can present complexities of analyzed program in different ways, including complexities associated with calls, e.g., many calls and callers vs. many entities vs. depth of call hierarchy. Further, each of the visualization variants may have different requirements associated with vertical and/or horizontal screen space required to present the variants. Each of the visualization variants may also be used differently, e.g., by a developer, based on how the visualization responds to changes in screen space and manipulation of the visualization by the developer.

In some implementations, some visualization variants can be integrated side-by-side, or the variants can be organized in tabbed views or inside a carousel element. Additionally, the user might be allowed to configure a preferred (e.g., default) visualization. In some implementations, the variant of a visualization can be selected automatically, e.g., based on which variant is likely to present information in the best way.

The generation and rendering of each of the different visualization variants can rely on the same set of information about the program and/or code fragment currently in focus. For example, the information needed for generating a visualization can include a list of entities and a call hierarchy, such as a schema described below with respect to FIG. 4. In some implementations, the information can further include information for enriching the visualization, such as additional entity-related information, source code location, documentation, performance data, and/or other information. Visualizations can also identify call candidates for a particular entity, such as for prototype-based, weakly-typed languages for which entity dependencies may only be estimated. In some implementations, data used for enhancing visualizations can be obtained by collecting and aggregating data from static and runtime code analysis, including retrieving meta-information from other sources, such as from a source code repository or a debugger (e.g., the debugger 228).

Figure 3A:
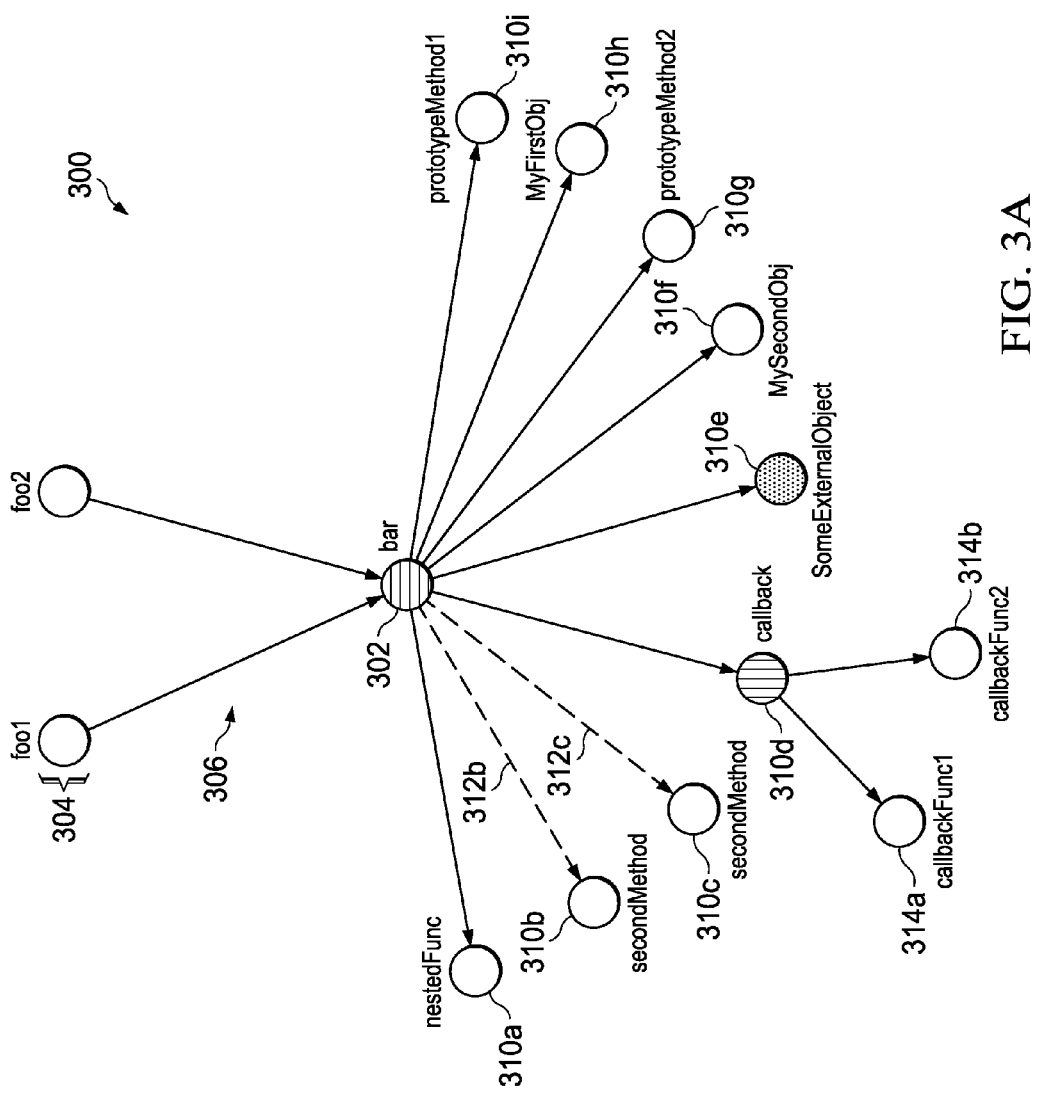
FIG. 3A shows an example graph visualization.
Figure 4:
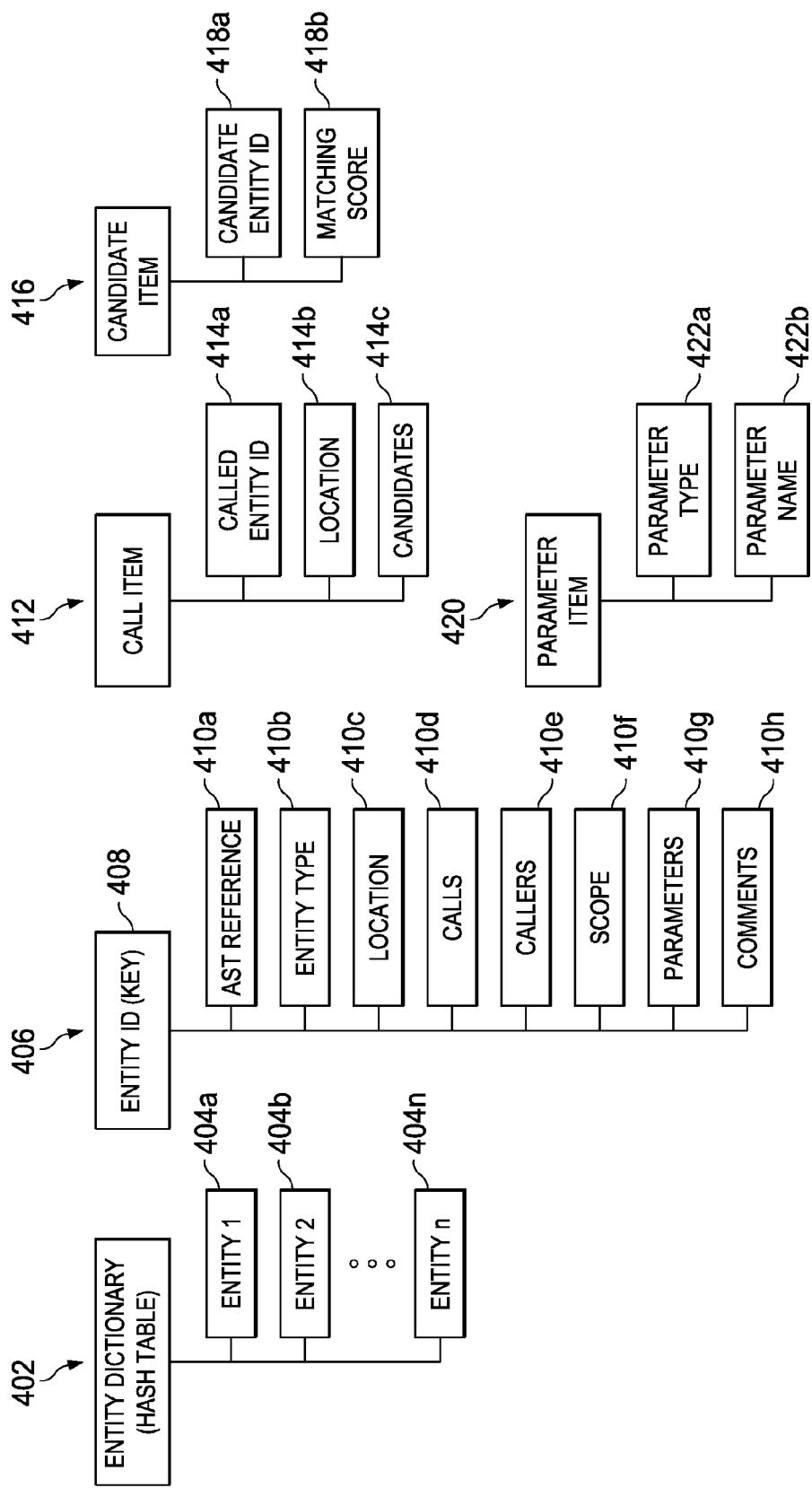
FIG. 4 is a diagram an example structure of an entity dictionary.

FIG. 3A shows an example graph visualization 300. For example, the graph visualization 300 can be an inter-entity, call-directed graph (IeC directed graph) visualization 300. The graph visualization 300 can show, for example, a graphical representation of the calls associated with a central entity. The representation can include, for example, both outgoing inter-entity calls, e.g., the calls that are contained in the definition of the entity, and incoming calls, e.g., the external entities from which the entity is called. In some implementations, the representation can also show recursive calls.

In terms of complexity of the analyzed program, the graph visualization 300 can be suitable for programs with many entities, as user controls/features can be used to hide particular entities in the visualization. For example, the graph visualization 300 can provide a good overview view of the first level of the call hierarchy. The graph visualization 300 may be less suitable for programs with many calls and callers, e.g., as the graph visualization 300 may become cluttered. In terms of screen space, the graph visualization 300 can provide a compact visualization since it only shows one level of the call hierarchy. In some implementations, using the graph visualization 300, for example, the user can manipulate the visualization by selecting a central entity.

In the graph visualization 300, entities such as functions and/or objects are represented as nodes in a graph, and calls between the entities are represented as directed edges of the graph. As shown in FIG. 3A, the graph visualization 300 is focused on the entity 302 (e.g., "bar") that is currently selected in the editor, and the entity 302 is represented by the central node of the graph. In some implementations, the entity 302, being the focus of the graph, can be represented in red or some other color, or shading can be used.

Entities 304a and 304b (e.g., "foo1" and "foo2") that are callers of the central entity are represented in the graph visualization 300 by nodes connected with arrows 306 pointing towards the central node (e.g., entity 302, "bar"). In some implementations, in order to emphasize that the entities 304 are predecessors in a possible flow of execution, the corresponding nodes can be drawn above of the central node, as is the case for the graph visualization 300.

Entities 310a-310i that are called by the central entity are represented by nodes connected with an arrow pointing away from the central entity. As these entities are likely to be located "under" the central entity in the call stack of an execution, they are also drawn below the central node. Recursive calls (i.e., the central entity calling itself) can be represented as circle-like arrow pointing back to the central node.

In some implementations, since a computer language associated with the graph visualization 300 may be weakly-typed, there may be plural entity candidates addressed by a call. For example, multiple entities to the same method, e.g. "secondMethod" for the entities 310b and 310c, can be associated with the same call and can be expressed by using an arrow with a dashed edge, as shown for arrows 312b and 312c.

In some implementations, the graph visualization 300 can include representations for passing callback functions as a parameter, which is a widely-used pattern in some languages such as ECMASCRIPT. While callback functions can allow inversion of control and can help to create generic, reusable code, callback functions can also make it difficult to identify behavioral dependencies in the code. The graph visualization 300 can facilitate the tracing of callback structures by highlighting callback functions, e.g., using yellow in multi-color displays, and as indicated using vertical hash fill for the "callback" node 310d. The graph visualization 300 can provide a list of functions, callback function 314a (e.g., "callbackFunc1") and callback function 314b ("callbackFunc2"). In the graph visualization 300, callback functions 314a and 314b can represent functions that can be passed to the central entity as parameters for the callback function, e.g., entity nodes connected to the "callback" node 310d.

In some implementations, in order to reduce clutter from the graph visualization 300, common helper methods can be filtered out. For example, "console.log" in the case of ECMASCRIPT and framework methods such as JQUERY can be removed from the graph visualization 300 in order to focus on application-unique methods.

In some implementations, the graph visualization 300 can provide additional information and/or controls to the user. For example, some controls can be in the form of a tooltip can be used for accessing documentation associated with a given entity.

In some implementations, different navigation techniques can be provided to allow the graph visualization 300 to be integrated with an IDE. As an example, navigation can include changing the position of the cursor in the code displayed in a currently-selected editor window, e.g., to a different portion of the code that has a different method name. Changing the cursor position in the editor, for example, can result in a corresponding change of the rendered graph, e.g., resetting the central entity. In some implementations, the user can click on nodes and edges in the graph. For example, clicking on a node in the graph can result in a change in the editor in which the corresponding entity is shown and/or highlighted within the definition source code. Double clicking on a node in the graph, for example, can set the cursor to the beginning of the definition of the method associated with the node, which can also reset the central entity. In some implementations, clicking on an edge in the graph can highlight, within the editor, the corresponding call in the code, and double-clicking on the node can cause an update to the cursor position within the editor. Other types of controls, operations, and integration between the graph visualization 300 and an IDE are possible.

In some implementations, when the target (or subject) of the code highlighting and/or code navigation is located in another file, the file that contains the source code can be opened in an additional editor window or tab. If the source location of the entity's definition is not contained in the input data provided by the static analyzer 212a (or otherwise not available to the user), then the node (e.g., "someExternalObject" node 310e) can be greyed out to indicate that the node cannot be used for navigation.

In some implementations, the graph visualization 300 can interact with other components of an IDE. For example, the graph visualization 300 can be integrated with the debugger 228, e.g., to show concrete parameter values for the current program execution. In another example, the graph visualization 300 can be used to start the debugger 228 for the central entity, such as by using a context menu command.

Figure 3B:
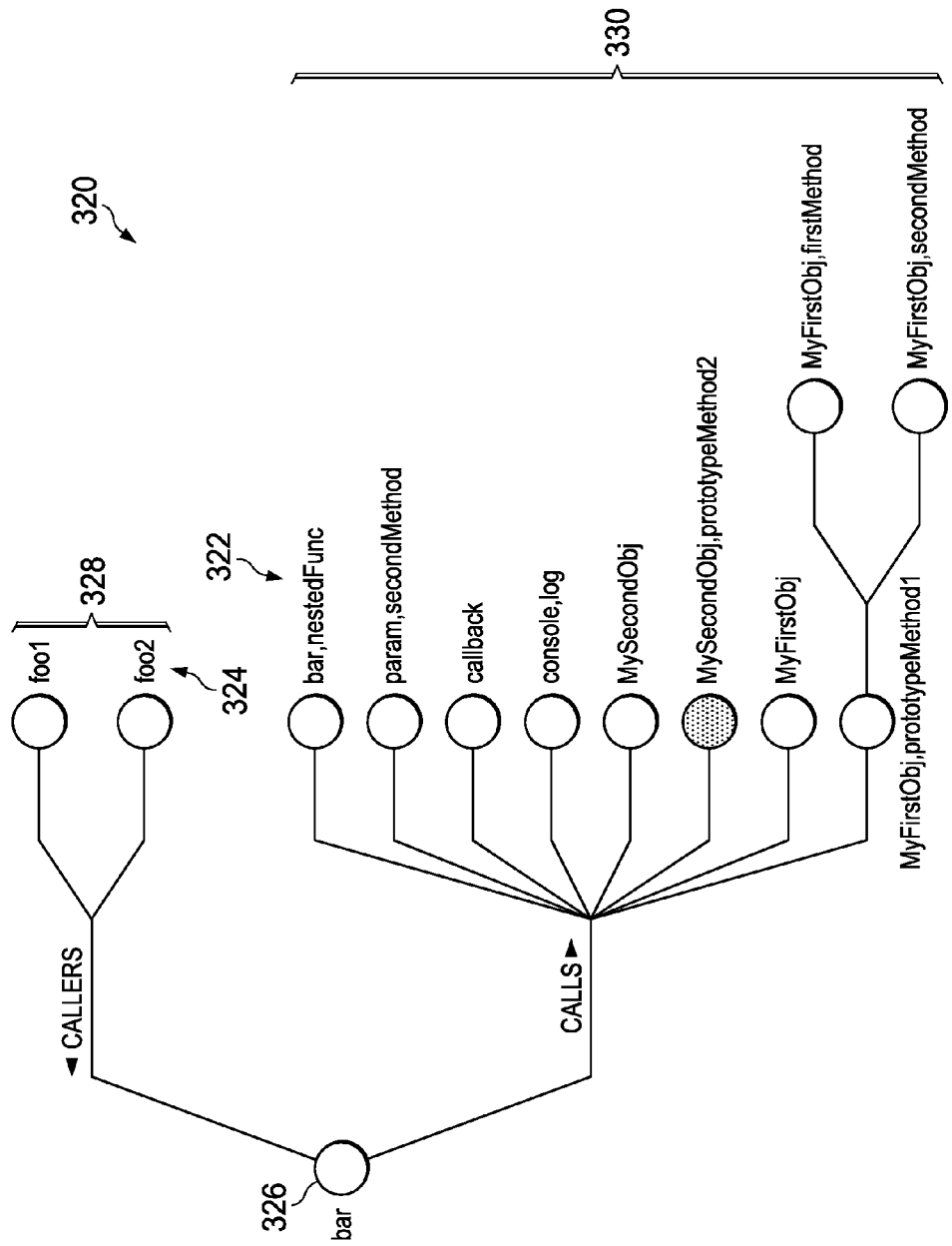
FIG. 3B shows an example tree visualization.

FIG. 3B shows an example tree visualization 320. For example, the tree visualization 320 can be an inter-entity, call-collapsible tree (IeC collapsible tree) visualization. The tree visualization 320 shows calls 322 and callers 324 of a selected central entity, e.g., "bar" root entity 326. Compared to the graph visualization 300, the tree visualization 320 offers an extra grouping of calls 322 and callers 324 visualized as branches of the tree. When the case exists that calls 322 have calls of their own, and/or when callers 324 are called by other entities, the tree visualization 320 can display the complete tree, including the additional nesting. In some implementations, controls can be provided to collapse or expand various nesting, including user-selectable calls, callers, and associated branches of the tree.

In terms of complexity of a given analyzed program, the tree visualization 320 can be especially suitable for programs with many entities, because part of the tree can be selectively hidden in this visualization. The tree visualization 320 can also provide a good overview of the entire call hierarchy. For example, for programs that have several calls 322 and callers 324, the tree visualization 320 can be collapsed to support clarity. For example, a large amount of screen space may be required for deep call hierarchies, and having the ability to collapse branches of the tree can compensate for this. However, if less screen space is available, the visualization can quickly become less clear. To control the amount of information displayed in the tree visualization 320, the user can directly manipulate the tree visualization 320 by collapsing nodes at different levels.

Entities in the tree visualization 320 are represented by nodes in the tree. The currently-selected entity, e.g., "bar" root entity 326, is represented as the root of the tree. There are two branches that originate from the root, e.g., a callers branch 328 and a calls branch 330. The callers branch 328, for example, represents entity calls to the selected entity. The calls branch 330, for example, represents calls originating from (e.g., called by) the selected entity. In some implementations, collections of callers and calls can be filtered to exclude common functions, or functions that are outside of the application's scope.

Further entity calls can be added to the tree visualization 320 as nodes with increasing depth from the root. For example, if an entity B that is called from a central entity A contains a call to an entity C, then the node representing B is a child of A's "calls" node, and C is a child node of B. Parent-child relationships can be applied to depict a hierarchy of callers, e.g., represented as a multi-level tree under the "callers" node.

Recursive calls, when they exist, can be represented in the tree visualization 320 similarly to other calls. For example, a recursive call by entity X to itself, entity X, can be represented by having entity X as a child of entity X's "calls" node. As such, an entity can be represented multiple times in a graph.

The tree structure of the tree visualization 320 can facilitate the clustering of call and/or caller groups. For example, the tree structure can aggregate candidates for a certain entity call or callback functions.

As described for the graph visualization 300, the tree visualization 320 can be annotated with additional information. For example, entity containment information can be derived from a node's name. Other ways are possible for displaying entity meta-data, such as tooltips or using different distinguishing display techniques, such as varied color schemes, different thicknesses of nodes and/or edges, different font families, and/or varying the size and/or decoration of a node's name.

In some implementations, the tree visualization 320 can be integrated with an IDE, e.g., integrated with the code editor component. For example, the tree visualization 320 can automatically update the central entity of the tree upon the occurrence of a cursor position change. In another example, a single click on a node representing an entity call can cause highlighting to occur to the respective call in the editor. If the corresponding code is located in another file, for example, the file can be opened in a new editor window (if not yet opened) and can be automatically selected.

Different techniques can be used to navigate, or show navigation options, within the tree visualization 320. For example, non-navigable nodes can be greyed out, e.g., for nodes for which no additional information is available to the user. A double click on a node, for example, can unfold or collapse the underlying nodes.

Similar to the graph visualization 300, the tree visualization 320 can be integrated with other IDE components. For example, regarding purposes associated with debugging, the tree visualization 320 can be especially suitable for providing a visualization of the stack trace of the current program execution. Other forms of integration between the tree visualization 320 and an IDE are possible.

Figure 3C:
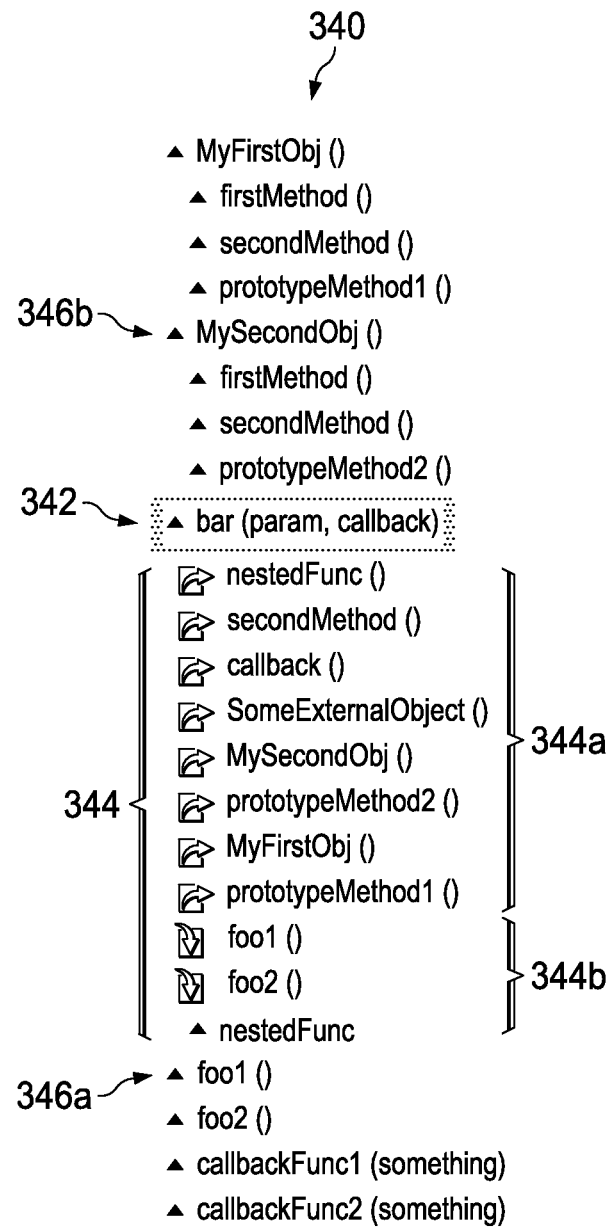
FIG. 3C shows an example outline visualization.

FIG. 3C shows an example outline visualization 340. For example, the outline visualization 340 can be an inter-entity call-outline list (IeC outline list) visualization. The outline visualization 340 can show, for example, a list of all functions that are associated with a given file. For example, for the "bar" element 342, functions 344 are listed, the listed functions including other entities that call or are called by "bar." Additionally, inter-entity calls can be shown for a selected entity. The outline visualization 340 can be integrated with an IDE. The integration can support, for example, navigation by the user between the outline visualization 340 can the IDE. The integration can further include, for example, code highlighting in the IDE that is triggered through the outline visualization 340. Other links to the corresponding code in an IDE can be provided.

In terms of complexity of an analyzed program, the outline visualization 340 can perform relatively well, mainly due to the fact that a longer list of entities can still easily be read. Filtering, as described above, and/or sorting of entities can be used. However, the outline visualization 340 may not be as well-suited for deep call hierarchy, as the visualization uses indentation which can become less useful visually as hierarchical levels are added. In terms of screen space, the outline visualization 340 can be more economical than other visualizations and can also adapt easily to reduced screen space, such as by using scroll bars. In the outline visualization 340, the user has the possibility to manipulate the visualization in various ways, including to select a central entity.

In the outline visualization 340, all entities associated with a specific file are listed. For example, each list entry can represent one specific entity and can be shown in the outline visualization 340 using the pattern: entityName(param1, param2, . . . , paramX). Each one of the entries in the outline visualization 340 can have its list of entities be folded or unfolded. For example, a folded entity representation (e.g., "foo1" entity 346*a*) hides the entities underneath the entity. An unfolded entity representation (e.g., "MySecondObj" entity 346*b*) display associated entities underneath the entity. In some implementations, placing a cursor over (or selecting in some other way) an entity will cause the entity to be unfolded.

As shown in FIG. 3C, indentation is used in the outline visualization 340 to indicate elements that are contained under a particular entity. For example, elements associated with the "bar" element 342, including functions 344, are indented below the "bar" element 342. Elements indented beneath, and associated with, an element can include called entities (e.g., functions 344*a*) and calling entities (e.g., functions 344*b*).

In some implementations, in the unfolded view, different types of entities can be depicted in different ways, including using different icons and/or colors to represent incoming, recursive and outgoing entity calls. For example, called entities (e.g., functions 344*a*) can be indicated using icons that have arrows (e.g., yellow arrows) pointing out of the particular entity. Calling entities (e.g., functions 344*b*) can be indicated using icons that have arrows (e.g., red arrows) pointing into the particular entity. In some implementations, different text colors or intensities can be used, e.g., normal or black text for entities for which additional information is available, and greyed out or lighter text for entities for which additional information is not available. In some implementations, to avoid clutter, entity calls can be depicted as entityName( ), e.g., and expanded to the full path of the entity (e.g., object-.entityName) only upon mouse-over or upon some other pre-determined user selection or control. Call candidates and callbacks can be grouped into a sub-list of the list element that represents the respective entity call.

In some implementations, lists can be tailored to meet the preferences of the developer. For example, common functions can be filtered out or the sequence of the entities can be changed from an ordering based on the appearance in the script to an alphabetical order. Additionally, searching for a certain entity can be supported by filtering the list according to a user-provided search term, or by highlighting entities that match the search.

In some implementations, the outline visualization 340 can be enriched with additional information. For example, entity-specific performance runtime data can be provided in a column next to the list or in some other appropriate manner.

The outline visualization 340 can be integrated with an IDE. For example, clicking on (or otherwise selecting) an entity in the outline visualization 340 can result in highlighting being applied to the entity in the editor. In another example, a double click on an entity in the outline visualization 340 can move the cursor to the corresponding entity in the IDE, and also can select the entity as a new central and unfolded entity in the outline visualization 340. A single click on an entity call in the outline visualization 340, for example, can cause highlighting of the corresponding entity call in the editor. A double click on an entity call in the outline visualization 340, for example, can cause highlighting of the entity declaration in the editor. Positioning the cursor in the editor to a different entity, for example, can set the selected entity as the new central entity in the outline visualization 340 and automatically unfold the entry.

In some implementations, the outline visualization 340 can allow a deep integration, not only with the editor, but with other components and functionality of an IDE. For example, a context menu associated with the list elements can be used to trigger a program-wide refactoring of the represented entities (e.g., renaming, extraction). In some implementations, the outline visualization 340 can also be integrated as an extension of a tree-based file navigator component, e.g., the tree visualization 320. For example, using the extension can allow the user to unfold a file node in the tree visualization 320 and use structures of the outline visualization 340 as a child structure inside of the tree visualization 320.

The visualizations 300, 320 and 340 can be based on analysis of one or more code languages and other sources. For example, the visualizations 300, 320 and 340 can be based on cross-language entity relationships determined from multiple modules and/or source files. The following code provides an example of client-side ECMASCRIPT code that represents the visualizations 300, 320 and 340:

```
var MyFirstObj = function( ) {
    return {
        firstMethod : function( ) { },
        secondMethod : function( ) { }
    };
};
```

```
MyFirstObj.prototype = {
    prototypeMethod1 : function( ) {
        this.firstMethod( );
        this.secondMethod( );
    }
};
var MySecondObj = function( ) {
    return {
        firstMethod : function( ) { },
        secondMethod : function( ) { }
    };
};
MySecondObj.prototype = {
    prototypeMethod2 : function( ) {
        this.firstMethod( );
        this.secondMethod( );
    }
};
function bar(param, callback) {
    function nestedFunc( ) {
    }
    nestedFunc( );
    param.secondMethod( );
    callback( );
    console.log("Cannot navigate");
    var obj = "this is a random string";
    obj = new SomeExternalObject( );
    obj = new MySecondObj( );
    obj.prototypeMethod2( );
    obj = new MyFirstObj( );
    obj.prototypeMethod1( );
}
function foo1( ){
    var param = new MySecondObj( );
    bar(param, callbackFunc1);
}
function foo2( ){
    var param = new MyFirstObj( );
    bar(param, callbackFunc2);
}
function callbackFunc1(something) {
    something.secondMethod( );
}
function callbackFunc2(something) {
    something.secondMethod( );
}
```

FIG. 4 is a diagram an example structure of an entity dictionary 400. For example, an entity dictionary can exist for one or more files containing software code, such as a computer program and associated functions or other components that are all contained in the same file. Other program files, for example, can have an associated entity dictionary having the same or a different structure (e.g., for a different language type). In some implementations, portions of the entity dictionary can exist for and be shared by a group of related programs in multiple files. The entity dictionary 400 can include information about objects, functions and their interactions, such as calls, parent-child relationships, and other information. For example, the information for the entity dictionary 400 can be obtained from code for an application written in any language, including weakly-typed scripting languages such as JavaScript. The data structure on which the entity dictionary 400 is based, for example, can provide direct access to entity meta-data for various users. Example users can include any consumer (e.g., a developer) that needs to make rapid queries with respect to advanced code analysis, or can use the information in an integrated use with an IDE.

In some implementations, the data structure on which the entity dictionary 400 can be instantiated as a hash table. For example, entries in the hash table can represent objects, functions, or other computer software items. Each entry in the data structure is uniquely identified, e.g., using a hierarchical encoding based on the place of its definition in the program. Parent-child relationships between entries can be represented by hierarchically-encoded unique identifiers or in some other way. Interactions, such as calls, between entities represented by the entries can be explicitly described as attributes of the entries. In some implementations, an entire program can be reconstructed syntactically from its corresponding hash table.

In some implementations, each file of a program can have its own corresponding hash table 402, e.g., an instance of the data structure. The data structure can contain information about artifacts present in the program (e.g., application), such as elements that are analyzed to generate the visualizations 300, 320, and 340. Each hash table 402 includes entries for entity names 404a-404n that correspond to the names of or identifiers for functions or other code artifacts.

In some implementations, the data structure can be implemented using a hash table, e.g., containing entries 406 of the form of "(KEY, VALUE)" pairs. KEY 408, for example, can represent a unique identifier for a code artifact, such as the name of a function or an object, e.g., indexed by entity names 404a-404n. The unique identifier can be inferred, for example, from its definition name or its place of declaration, thus uniquely indicating the place in the code declaration hierarchy. Anonymous and immediately executed functions can be handled, for example, in a distinctive manner, based on their definition in the current scope.

VALUE 410, for example, can represent a complex structure containing attributes that are determined from analysis of the application code. For example, the attributes can include attributes 410a-410h for a specific one of the entities (e.g., entity "BAR") with entity names 404a-404n. An attribute can be, for example, a reference or structure containing a partition of an abstract syntax tree (AST), e.g., AST reference 410a corresponding to the part of the code referring to the current artifact described by KEY.

An entity type attribute 410b, for example, can be a type attribute that indicates the type of the referenced code artifact. Example entity types include "function," "object" and other types. For example, the "BAR" entity may have an entity type of "function."

A location attribute 410c, for example, can be an attribute that identifies location information. For example, the location information can define start and end lines and columns positions within a program, such as a program source file. The location of the "BAR" entity, for example, can include the lines and columns that "BAR" occupies in the source file that includes "BAR."

A calls attribute 410d, for example, can include information for a list of called entities. The list can identify a list of artifacts, including functions or objects, that are called or instantiated within the current entity, e.g., the "BAR" entity. Each item of the list of called items can contain several sub-attributes, e.g., identified in a call item structure 412. Each called item in the list of called items can be indexed (and linked to the calling entity) using a hash table artifact reference to the called artifact, e.g., using a KEY identifier 414a for direct access.

A location sub-attribute 414b, for example, can include location information, e.g., start and end lines and columns positions of the call in the calling program. The location information can include information that facilitates navigation to other files and to other file types. For example, the navigation can include navigation in any of the visualizations 300, 320 and 340 that may occur if the user selects a control or performs an operation that changes the central entity, causes an entity to be highlighted, or for some other reason.

A candidates sub-attribute 414c, for example, can identify a list of candidates for call-back functions. The list can either include a hash table artifact reference or can reference (or point to) the above-mentioned reference. The list of callbacks can contain calls of two types. For example, a candidate call can be a call to a callback function passed as arguments. In this example, each item of the list can be a reference to an actual code artifact (e.g., using the KEY identifier for direct access) that is being used as callback. In another example, a candidate call can be a call to a computed (inferred) candidate item 416. In this example, each item of the list can be a structure containing a candidate entity ID 418a and a matching score 418b. The candidate entity ID 418a, for example, can be a reference to an actual code artifact (e.g., using a KEY identifier for direct access). The matching score 418b, for example, can identify a degree of probability that the call actually references this item. The probability can be computed using various techniques, such as using string-matching algorithms, static analysis inference, or other techniques.

A callers attribute 410e, for example, can identify and/or define a list of callers taking the form of a list. Each item in the list can reference the hash table artifacts that call the current entity (vice-versa to the calls attribute).

A scope attribute 410f, for example, can include a structure that describes, on a per variable basis, different initialization values (pointing to code artifacts described as hash table KEYs) that occur in the current artifact. Additional information (e.g., a list of locations where a variable is used) can be used to facilitate variable navigation and refactoring.

A parameters attribute 410g, for example, can include information that identifies a list of parameters, e.g., parameter items 420. For example, each parameter item 420 can define a current entity's parameters. For a function such as function f(a,b), for example, the parameters attribute 410g can consist of a list of two items. Each item can be represented using a parameter item 420, having an associated parameter type 422a (e.g., "identifier"), a parameter name 422b (e.g., "a" or "b"), and location information (e.g., the position of the parameter in the parameter list, such as first, second).

A comments attribute 410h, for example, can include a list of comments preceding, or associated with, the entity definition. For example, comments can include or provide tooltips and code documentation.

In some implementations, other attributes, in addition to the attributes 410a-410h, can include references or structures that contain program-related data derived from sources other than static code analysis. For example, the other attributes can include runtime information or repository metadata, e.g., used for enhancing static analysis results. For instance, if a variable at a certain step for a specific run (given specific input parameters) will be initialized based on a condition, then only that initialization is subsequently taken into account. This information can be used, for example, as opposed to the static analysis result, which displays information about both cases—either satisfying or not satisfying the condition.

Figure 5A:
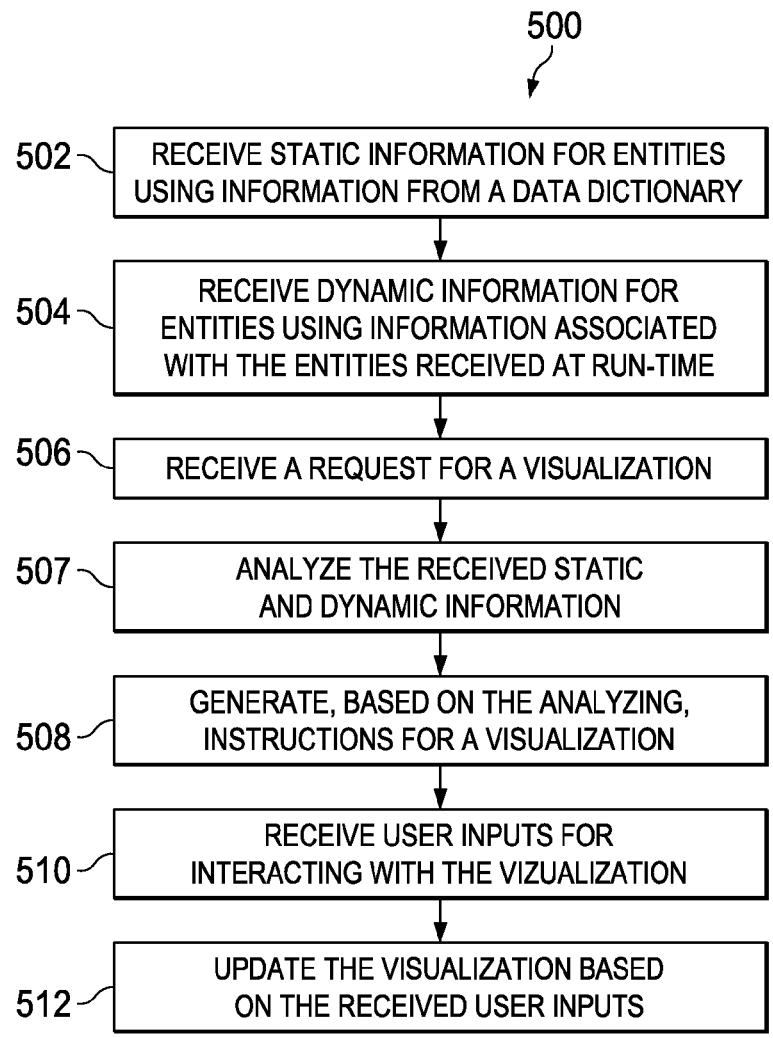
FIG. 5A is a flowchart of an example method for providing and updating inter-entity call visualizations.

FIG. 5A is a flowchart of an example method 500 for providing and updating inter-entity call visualizations. For clarity of presentation, the description that follows generally describes method 500 in the context of FIGS. 1-2, 3A-3C, and 4. However, it will be understood that the method 500 may be performed, for example, by any other suitable system, environment, software, and hardware, or a combination of systems, environments, software, and hardware as appropriate. For example, the client device 130 and/or its components can be used to execute the method 500, e.g., using information accessed from the server 110.

At 502, static information is received for entities using information from an entity dictionary. As an example, the static information for source code can be received from a source code repository using the file repository service 226, as described above with reference to FIGS. 2 and 4. The entity dictionary can include, for example, an entity hash table that identifies entities in the entity dictionary. Each entity in the hash table can include, for example, an abstract syntax tree (AST) reference, an entity type, a location, a list of called entities, a list of called-by entities, a scope, a parameter set including parameter items, and comments. For each called entity, the entity dictionary can include, for example, a called entity identifier, a location, and a set of candidate call entities. For each parameter item, the entity dictionary can include, for example, a parameter type and a parameter name. For each candidate called entity, the entity dictionary can include, for example, a candidate entity identifier and a matching score.

In some implementations, the entities are entities associated with computer code. For example, the entities can include functions and/or other components of ECMASCRIPT or some other computing language.

At 504, dynamic information is received for entities using information associated with the entities received at run-time. For example, information about code that is being executed can be received from the debugger 228 or from some other source.

At 506, a request for a visualization is received. For example, the server 202 can receive a request from the client 204 for a visualization, such as when the developer 206 performs an action in the development interface 222.

At 507, the static and dynamic information are analyzed. As an example, the static analyzer 212a can perform static analysis on source code stored in the source code repository, as described above with reference to FIGS. 2 and 4. The dynamic analyzer 212b, for example, can analyze the information. The analysis interface 210 can store the analysis results, for example, in the analysis results database 214.

At 508, based on the analyzing, instructions are generated for a visualization. For example, the analysis interface 210 can generate the visualization, e.g., using information from the analysis results database 214 in combination with associated information stored for a program file and accessible from the file repository service 226. In some implementations, the analysis interface 210 can request that the analyzers 212 perform static and/or dynamic analysis, e.g., if the analysis results are out-of-date e.g., if the file was updated and saved in the meantime.

In some implementations, the visualization is an inter-entity, call-directed graph visualization, an inter-entity, call-collapsible tree visualization, or an inter-entity call-outline list visualization. For example, the visualizations can show relationships in graphs, trees or outlines, as described above with respect to FIGS. 3A-3C. Other forms of visualizations are possible.

In some implementations, the visualization is integrated with an integrated development environment (IDE) including an editor. For example, visualizations such as visualizations 300, 320 and 340 can be integrated with IDEs or other tools, as described above with respect to FIGS. 3A-3C At 510, user inputs for interacting with the visualization are received. For example, the flow visualization service 220 can receive or detect inputs by the developer 206 that can require that the visualization that is presented be updated in some way. If necessary, development interface 222 can request additional or updated information from the analysis interface 210.

At 512, the visualization is updated based on the received user inputs. As an example, the flow visualization service 220 can present the updated visualization if the information needed is already stored locally at the client 204 or if new information is received from the analysis interface 210.

In some implementations, user actions in either one of a given visualization or the IDE cause actions to occur in the other. For example, referring to FIGS. 3A-3C, user actions relative to the visualizations 300, 320 or 340 can cause associated actions to occur in coincident IDEs or various IDE components, e.g., editor windows.

In some implementations, the one or more operations include hiding elements of the visualization, exposing elements of the visualization, changing a central focus of the visualization, displaying additional information associated with a particular element, switching the display to a different visualization, causing associated elements in the visualization or the editor to be highlighted.

Figure 5B:
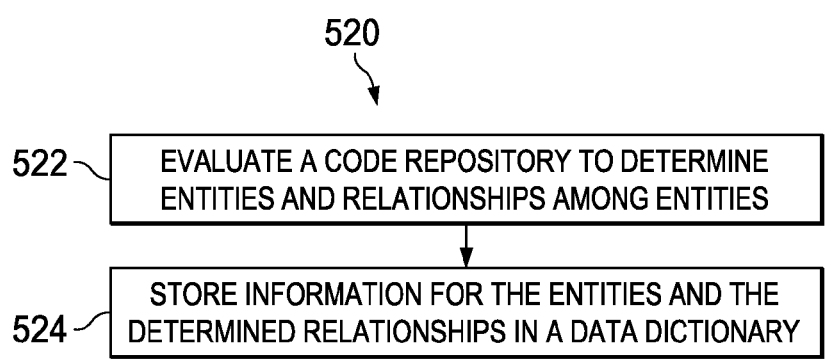
FIGS. 5B-5D are flowcharts of example methods for generating an entity dictionary.

FIG. 5B is a flowchart of an example method 520 for generating an entity dictionary. For clarity of presentation, the description that follows generally describes method 520 in the context of FIG. 1. However, it will be understood that the method 520 may be performed, for example, by any other suitable system, environment, software, and hardware, or a combination of systems, environments, software, and hardware as appropriate.

At 522, a code repository is evaluated to determine entities and relationships among entities. For example, referring to FIG. 1, code analyzers 116 can analyze code in the code repository 122, such as a program file that includes plural functions in the same file or multiple files containing multiple functions.

At 524, information for the entities and the determined relationships is stored in the entity dictionary. For example, an entity hash table is stored that identifies entities in the entity dictionary. For each entity, an abstract syntax tree reference, an entity type, a location, a list of called entities, a list of called-by entities, a scope, a parameter set including parameter items, and comments are stored. For each called entity, a called entity identifier, a location, and a set of candidate call entities are stored. For each parameter item, a parameter type and a parameter name are stored. For each candidate called entity, a candidate entity identifier and a matching score are stored. The stored data, for example, can be stored consistent with the elements shown in FIG. 4.

Figure 5C:
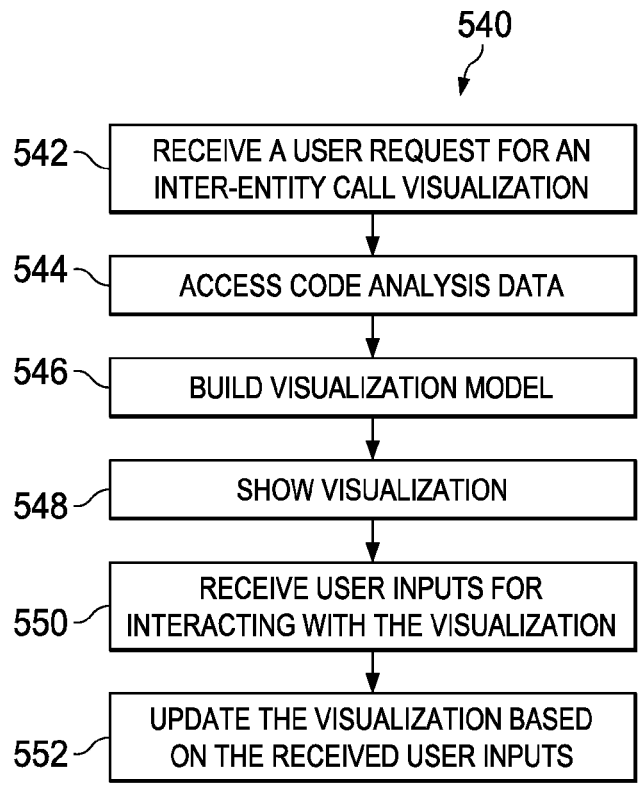

FIG. 5C is a flow diagram of an example method 540 for providing an inter-entity call visualization. For clarity of presentation, the description that follows generally describes method 540 in the context of FIGS. 1 and 2. However, it will be understood that the method 540 may be performed, for example, by any other suitable system, environment, software, and hardware, or a combination of systems, environments, software, and hardware as appropriate. In some implementations, the method 540, when combined with method 560 described below with reference to FIG. 5D, can replace the method 520. For example, the method 540 can be a client-side, visualizer-specific method supporting the different types of visualizations described above.

At 542, a user request is received for an inter-entity call visualization. For example, the request can be received when the user clicks on a menu entry that adds a visualizer view to the IDE.

At 544, code analysis data is accessed. For example, the code analysis layer 208 can be called to provide code analysis data for the entities of interest (e.g., the entries to be visualized).

At 546, a visualization model is built. For example, based on the received analysis data, the visualizer can generate a visualization model containing the information to be shown in the graph/tree/list (e.g., depending on the visualizer type).

At 548, the visualization is shown. For example, the specific visualization model is rendered.

At 550, user inputs are received for interacting with the visualization. For example, the user inputs can be received after the user clicks on a node in the graph/tree/list.

At 552, the visualization is updated based on the received user inputs. As an example, in addition to updating of the visualization, additional code analysis data can be retrieved. In another example, other IDE components can be updated, such as by highlighting code in the editor.

Figure 5D:
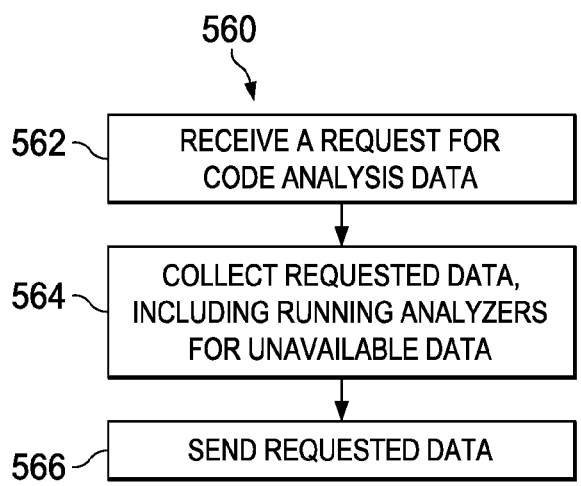

FIG. 5D is a flow diagram of an example method 560 for handling an analysis request. For clarity of presentation, the description that follows generally describes method 560 in the context of FIGS. 1 and 2. However, it will be understood that the method 560 may be performed, for example, by any other suitable system, environment, software, and hardware, or a combination of systems, environments, software, and hardware as appropriate. In some implementations, the method 560, when combined with method 540 described above, can replace the method 520. For example, the method 560 can be performed by the server-side, code analysis layer.

At 562, a request is received for code analysis data. For example, the request can originate from a component that is responsible for code completion, or from the inter-entity call visualizer tool.

At 564, the requested data collected, including running analyzers for any available data. As an example, the analysis interface 210 can check to see if the requested entities are available in the existing entity dictionary, and if not, analysis can be run, as described above with reference to FIG. 5B.

At 566, the requested data is sent. For example, provide the collected data, as described above with reference to FIG. 4.

In some implementations, other processes can exist that support the systems and methods described herein. For example, a method can exist for updating the entity dictionary if a file is created, updated or deleted. In another example, a method can exist for enriching the entity dictionary with information collected from other sources, e.g., if runtime/debugger information is available.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for generating visualizations of inter-entity calls, comprising:
receiving static information for entities using information from an entity dictionary derived from a static and dynamic code analysis, the entity dictionary including:
for each particular entity of the entities, an abstract syntax tree reference, an entity type, a location, a list of called entities, a list of called-by entities, a scope, a parameter set including parameter items, and comments;
for each called entity of the list of called entities, a called entity identifier, a location, and a set of candidate call entities;
for each parameter item of the parameter set, a parameter type and a parameter name; and
for each candidate called entity of the set of candidate called entities, a candidate entity identifier and a matching score;
receiving dynamic information for the entities using information associated with the entities received at run-time;
receiving a request for a visualization, the visualization including a hierarchical representation of inter-entity calls among the entities, including inter-entity calls between entities in a same source code file, including source code files of weakly-typed, prototype-based languages;
analyzing the static information and the dynamic information;
generating, based on the analyzing, instructions for presenting the visualization;
receiving user inputs for interacting with the visualization; and
updating the visualization based on the received user inputs.

2. The computer-implemented method of claim 1, wherein the entities are entities associated with computer code.

3. The computer-implemented method of claim 1, wherein the visualization is one of:
an inter-entity, call-directed graph visualization;
an inter-entity, call-collapsible tree visualization; and
an inter-entity call-outline list visualization.

4. The computer-implemented method of claim 1, wherein the visualization is integrated with an integrated development environment (IDE) including an editor.

5. The computer-implemented method of claim 4, wherein the IDE is cloud-based and the visualization is part of a cloud-based computer code analysis.

6. The computer-implemented method of claim 4, wherein user actions in either one of a given visualization or the IDE cause actions to occur in the other.

7. The computer-implemented method of claim 1, wherein the one or more user inputs include hiding elements of the visualization, exposing elements of the visualization, changing a central focus of the visualization, and displaying additional information associated with a particular element.

8. The computer-implemented method of claim 7, wherein the one or more user inputs further include switching the display to a different visualization and causing associated elements in the visualization or the editor to be highlighted.

9. A non-transitory computer-readable medium comprising computer-readable instructions which, when executed by at least one hardware processor, cause the hardware processor to:
receive static information for entities using information from an entity dictionary derived from a static and dynamic code analysis, the entity dictionary including:
for each particular entity of the entities, an abstract syntax tree reference, an entity type, a location, a list of called entities, a list of called-by entities, a scope, a parameter set including parameter items, and comments;
for each called entity of the list of called entities, a called entity identifier, a location, and a set of candidate call entities;
for each parameter item of the parameter set, a parameter type and a parameter name; and
for each candidate called entity of the set of candidate called entities, a candidate entity identifier and a matching score;
receive dynamic information for the entities using information associated with the entities received at run-time;
receive a request for a visualization, the visualization including a hierarchical representation of inter-entity calls among the entities, including inter-entity calls between entities in a same source code file, including source code files of weakly-typed, prototype-based languages;
analyze the static information and the dynamic information;
generate, based on the analyzing, instructions for presenting the visualization;
receive user inputs for interacting with the visualization; and
update the visualization based on the received user inputs.

10. The computer-readable media of claim 9, wherein the entities are entities associated with computer code.

11. The computer-readable media of claim 9, wherein the visualization is one of:
an inter-entity, call-directed graph visualization;
an inter-entity, call-collapsible tree visualization; and
an inter-entity call-outline list visualization.

12. The computer-readable media of claim 9, wherein the visualization is integrated with an integrated development environment (IDE) including an editor.

13. The computer-readable media of claim 12, wherein the IDE is cloud-based and the visualization is part of a cloud-based computer code analysis.

14. The computer-readable media of claim 13, wherein user actions in either one of a given visualization or the IDE cause actions to occur in the other.

15. The computer-readable media of claim 9, wherein the one or more user inputs include hiding elements of the visualization, exposing elements of the visualization, changing a central focus of the visualization, and displaying additional information associated with a particular element.

16. The computer-readable media of claim 15, wherein the one or more user inputs further include switching the display to a different visualization and causing associated elements in the visualization or the editor to be highlighted.

17. A computer system, comprising:
at least one hardware processor;
a computer memory interoperably coupled with the at least one hardware processor and configured to:
receive static information for entities using information from an entity dictionary derived from a static and dynamic code analysis, the entity dictionary including:
for each particular entity of the entities, an abstract syntax tree reference, an entity type, a location, a list of called entities, a list of called-by entities, a scope, a parameter set including parameter items, and comments;
for each called entity of the list of called entities, a called entity identifier, a location, and a set of candidate call entities;
for each parameter item of the parameter set, a parameter type and a parameter name; and
for each candidate called entity of the set of candidate called entities, a candidate entity identifier and a matching score;
receive dynamic information for the entities using information associated with the entities received at run-time;
receive a request for a visualization, the visualization including a hierarchical representation of inter-entity calls among the entities, including inter-entity calls between entities in a same source code file, including source code files of weakly-typed, prototype-based languages;
analyze the static information and the dynamic information;
generate, based on the analyzing, instructions for presenting the visualization;
receive user inputs for interacting with the visualization; and
update the visualization based on the received user inputs.

18. The computer system of claim 17, wherein the entities are entities associated with computer code.

19. The computer system of claim 17, wherein the visualization is one of:
an inter-entity, call-directed graph visualization;
an inter-entity, call-collapsible tree visualization; and
an inter-entity call-outline list visualization.

20. The computer system of claim 17, wherein the visualization is integrated with an integrated development environment (IDE) including an editor.

21. The computer system of claim 20, wherein the IDE is cloud-based and the visualization is part of a cloud-based computer code analysis.

22. The computer system of claim 20, wherein user actions in either one of a given visualization or the IDE cause actions to occur in the other.

23. The computer system of claim 17, wherein the one or more user inputs include hiding elements of the visualization, exposing elements of the visualization, changing a central focus of the visualization, displaying additional information associated with a particular element, switching the display to a different visualization, causing associated elements in the visualization or the editor to be highlighted.

* * * * *